United States Patent
Mazzini

(10) Patent No.: US 11,752,994 B2
(45) Date of Patent: *Sep. 12, 2023

(54) APPARATUS FOR SELECTIVELY SHARING THE POWER OF A MULTIDRIVE UNIT VEHICLE

(71) Applicant: Solaredge Technologies Ltd., Herzeliya (IL)

(72) Inventor: Samuele Mazzini, Umbertide (IT)

(73) Assignee: Solaredge Technologies Ltd., Herzeliya (IL)

( * ) Notice: Subject to any disclaimer, the term of this patent is extended or adjusted under 35 U.S.C. 154(b) by 74 days.

This patent is subject to a terminal disclaimer.

(21) Appl. No.: 17/383,591

(22) Filed: Jul. 23, 2021

(65) Prior Publication Data

US 2022/0001849 A1    Jan. 6, 2022

Related U.S. Application Data

(63) Continuation of application No. 16/328,134, filed as application No. PCT/IT2017/000274 on Dec. 1, 2017, now Pat. No. 11,097,714.

(30) Foreign Application Priority Data

Dec. 6, 2016   (IT) .................. 102016000123644

(51) Int. Cl.
*B60W 20/00* (2016.01)
*B60K 6/26* (2007.10)
(Continued)

(52) U.S. Cl.
CPC ............... *B60W 20/00* (2013.01); *B60K 6/26* (2013.01); *B60K 6/387* (2013.01); *B60K 6/40* (2013.01);
(Continued)

(58) Field of Classification Search
CPC ...... B60W 20/00; B60W 10/06; B60W 10/08; B60W 20/50; B60K 6/26; B60K 6/387;
(Continued)

(56) References Cited

U.S. PATENT DOCUMENTS

| 5,661,378 A | 8/1997 | Hapeman |
| 6,170,587 B1 | 1/2001 | Bullock |

(Continued)

FOREIGN PATENT DOCUMENTS

| JP | 2002502337 A | 1/2002 |

OTHER PUBLICATIONS

Aug. 18, 2021—Japanese Office Action—JP 2019-511590.
Oct. 31, 2022—EP Search Report—EP App. No. 22188280.6.

*Primary Examiner* — Frederick M Brushaber
(74) *Attorney, Agent, or Firm* — Banner & Witcoff, Ltd.

(57) ABSTRACT

An apparatus for selectively sharing, towards separate users, the power of a multi-drive unit vehicle, includes a mechanical transmission, that connects propulsion units of the vehicle to at least one primary drive unit; a secondary power unit for service units, which is operatively positioned between the mechanical transmission and at least one service unit of the vehicle; as well as at least one of either a first or a second joint, that are mounted on the mechanical transmission on either side of the secondary power unit for service units and are switchable by operating suitable control means.

18 Claims, 2 Drawing Sheets

(51) Int. Cl.
  *B60K 6/387* (2007.10)
  *B60K 6/40* (2007.10)
  *B60K 6/48* (2007.10)

(52) U.S. Cl.
  CPC .............. *B60K 6/48* (2013.01); *B60Y 2200/92* (2013.01); *Y02T 10/62* (2013.01)

(58) Field of Classification Search
  CPC ........ B60K 6/40; B60K 6/48; B60Y 2200/92; Y02T 10/62; Y02T 10/72
  See application file for complete search history.

(56) References Cited

U.S. PATENT DOCUMENTS

| | | |
|---|---|---|
| 6,986,727 B2 | 1/2006 | Kuras et al. |
| 7,911,079 B2 | 3/2011 | Hoff et al. |
| 8,025,115 B2 | 9/2011 | King et al. |
| 8,324,846 B2 | 12/2012 | Marchand et al. |
| 8,708,071 B2 | 4/2014 | Yokoyama et al. |
| 9,401,617 B2 | 7/2016 | Kaefer |
| 2002/0019294 A1 | 2/2002 | Yamazaki et al. |
| 2002/0079853 A1 | 6/2002 | Schmitz et al. |
| 2002/0108373 A1* | 8/2002 | Frey .................. B60L 15/2009 60/706 |
| 2009/0095549 A1 | 4/2009 | Dalum et al. |
| 2010/0018808 A1* | 1/2010 | Gloge ................ F16H 61/0031 184/6.12 |
| 2010/0078281 A1* | 4/2010 | Kajigai ................ B60K 6/365 192/3.21 |
| 2012/0109440 A1 | 5/2012 | Wyatt et al. |
| 2014/0171259 A1* | 6/2014 | Genise .................. F16D 21/00 903/902 |

\* cited by examiner

APPARATUS FOR SELECTIVELY SHARING THE POWER OF A MULTIDRIVE UNIT VEHICLE

This Application is a continuation of U.S. application Ser. No. 16/328,134, filed Feb. 25, 2019, which is the National Phase Application of International Application PCT/IT2017/000274 filed Dec. 1, 2017, which claims priority to Italian Application No. 102016000123644 filed Dec. 6, 2016, each of which is incorporated by reference herein.

TECHNICAL FIELD

This invention relates to an apparatus for selectively sharing, towards separate users, the power of a multi-drive unit vehicle.

BACKGROUND ART

As is known, many motor vehicles of the current build type are equipped with many services that are auxiliary and accessory to the driving of vehicle movement, that is to say, not assigned to actual propulsion of the vehicle.

Some of those services also require levels of power that are considerable and, in the case of electric drive units, are even difficult to supply, since the electric voltages involved are low.

Consider, for example, the vehicle air conditioning system, where the maximum power required is often greater than 3 kW; or the power steering system, in which the power used is approximately 1 Kw; or even the compressor of the brake and suspension circuit which, in large capacity vehicles may require power levels even greater than 5 Kw. Similar conditions occur for the power take offs of commercial or special vehicles, which may use levels of power comparable to or, at times, greater than the levels of power required for driving vehicle movement.

In a traditional vehicle, all of these services draw the power necessary for their operation directly from the drive unit that propels the vehicle, or from an auxiliary drive unit or power supply system dedicated specifically to the service.

In the former case, a first disadvantage is the fact that operation of the auxiliary services is linked to the variation in the speed (revolutions) of the drive unit that drives vehicle movement, which, varying constantly due to the variable requirements of the road route, makes the efficiency of the supply of power to secondary service units dependent on the instantaneous power actually and residually available. That is to say, dependent on the share of the power that is not needed for driving vehicle movement. Another disadvantage is also the fact that where the drive unit for driving vehicle movement is a combustion engine and must be kept running even if services are required while the vehicle is stationary, this results in wasted power, the production of polluting emissions and reduced efficiency.

That is obvious, for example, in applications such as the "crane truck" type where, once the vehicle has reached the destination, use of the auxiliary service may even continue for weeks or months, during which time the drive unit for driving vehicle movement must be kept running in order to supply power to the lifting system. That even applies if the power needed is several orders of magnitude lower than the power output that the drive unit for driving vehicle movement is actually capable of supplying. Moreover, it should be noticed that this architecture is possible, in use, only if the drive unit for driving vehicle movement can be mechanically disconnected from the driving wheels.

In the case of a combustion engine that is easily feasible, since by its nature the system requires a mechanical disconnection, due to the fact that the engine cannot drop below a minimum number of revolutions without stalling.

A very different condition is encountered in direct electric drive vehicles.

In fact, in these, the disconnection method referred to above may be difficult to implement, meaning that an alternative solution used is that of installing motors dedicated specifically to the individual services.

However, whilst on one hand this solution has the advantage of removing the link between the motor speeds, on the other hand it disadvantageously requires an increase in the components necessary, consequently increasing: system complexity, weights, costs and overall dimensions.

With regard to that, consider for example vehicles with auxiliary services whose power requirements are comparable to the power needed to drive vehicle movement. These vehicles would have to be fitted with two motors of comparable dimensions, one solely for driving vehicle movement, the other solely for the auxiliary service. Moreover, such vehicles would have to be equipped with other motors for additional auxiliary services using lower levels of power.

DISCLOSURE OF INVENTION

The technical purpose of this invention is therefore to overcome such disadvantages. Accordingly, these results are achieved by means of an apparatus for selectively sharing, towards separate users, the power of a multi-drive unit vehicle, made in accordance with claim 1.

The technical features of the invention, which fulfil the technical purpose, are clearly described in the appended claims.

BRIEF DESCRIPTION OF DRAWINGS

The advantages of the invention are more apparent in the detailed description which follows, with reference to the accompanying drawings which illustrate an example, non-limiting embodiment of the invention, in which.

BEST MODE FOR CARRYING OUT THE INVENTION

Figure 1:
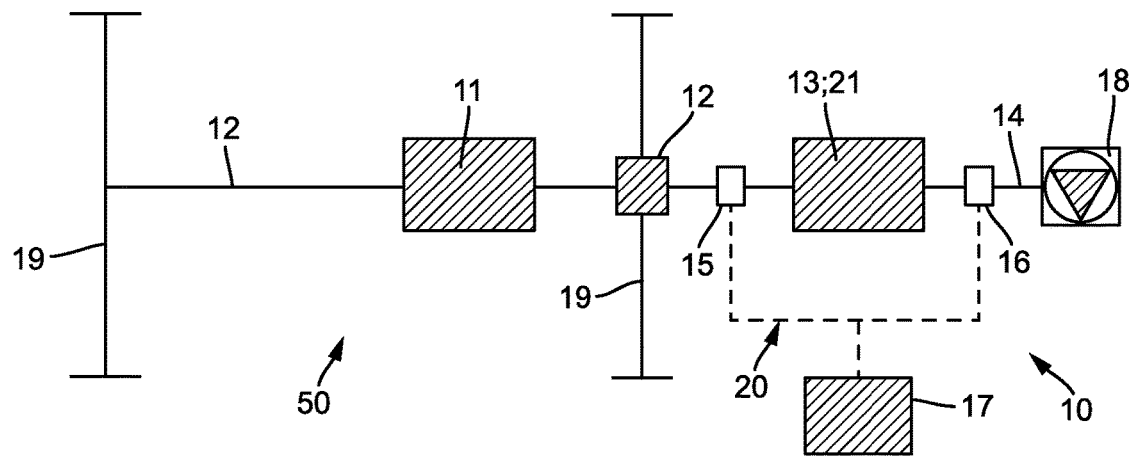
FIG. 1 is an operating block diagram schematically illustrating a motor vehicle equipped with an apparatus according to the invention.

With reference to the figures of the accompanying drawings, in FIG. 1 the numeral (50) denotes a schematic diagram of a generic, multi-drive unit vehicle that comprises an apparatus (10) for selectively sharing towards separate users (19; 18) the total power that can be supplied by the plurality of drive units (11; 21).

The apparatus (10) basically comprises a mechanical transmission (12) that connects propulsion units (19) of the vehicle (50) to one or more primary drive units (11); and a secondary power unit (13) for service units, which is operatively positioned between the mechanical transmission (12) and one or more service or auxiliary units (18) of the vehicle (50).

The apparatus (10) also comprises a first and a second joint (15, 16), that are mounted on the mechanical transmission (12) on either side of the secondary power unit (13) for service units and are switchable by operating suitable control means (20).

More particularly, said control means (20) comprise a microprocessor-type controller (17), operatively interfaced with said joints (15, 16), for selectively activating the sharing of power between the propulsion units (19) and said one or each service unit (18), relative to operation required of the vehicle (50) at the various moments of its use.

The primary drive unit (11) may be a combustion engine or an electric motor.

The secondary power unit (13) for service units comprises one or more secondary drive units (21), which are electric motors or combustion engines, for generating power to be sent to one or more of said service units (18).

The microprocessor-type controller (17) is adapted for managing the sharing of power towards the propulsion units (19) in a highly flexible way. In fact, the sharing may be performed, for example, by giving prevalent, priority or exclusive status to requests for driving (propelling) power that come from said propulsion units (19), made necessary by the requirements of driving the movement of the vehicle (50).

Similarly, the microprocessor-type controller (17) is adapted for managing the sharing of power towards said one or each service unit (18), depending on a variety of different correlations resulting, for example, between requests for driving power for the propulsion units (19) and efficiency curves (22) characteristic of said primary drive units (11) and/or secondary drive units (21) relative to which optimum management can be achieved both in terms of propulsion performance, and accessory services of the vehicle (50).

Several examples provided below give a clearer description of some features and advantages of the invention.

Figure 2:
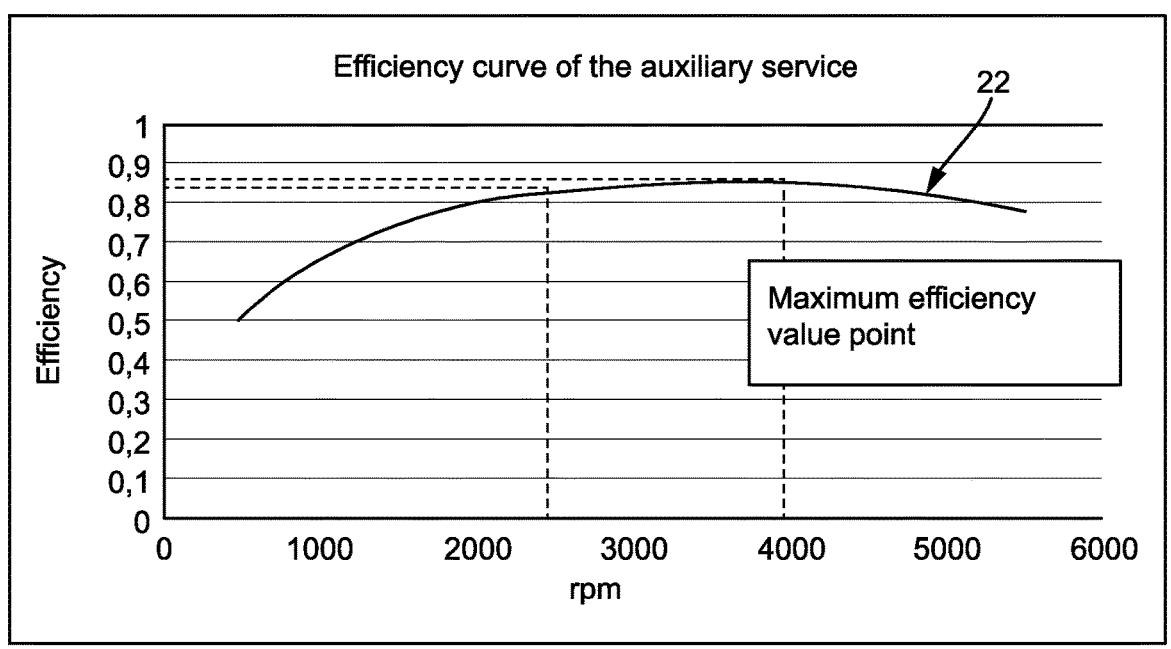
FIG. 2 is an efficiency curve of an auxiliary service of the vehicle.

Imagine that the primary drive unit (11), for driving vehicle movement, is an electric motor with a maximum power of 30 kW and the secondary power unit (13) is a secondary electric motor (21), with a maximum power of 10 kW, dedicated for example to supplying power to a refrigerating compressor with efficiency shown in FIG. 2 by the efficiency curve (22).

If the joint (15) is disconnected, the two electric motors (11, 21) are independent of each other and the secondary power unit (13) can supply its power for compressor unit maximum efficiency. That is to say, it reaches 4,000 rpm, irrespective of the speed and conditions of the vehicle (50). Therefore, with this configuration, the auxiliary unit (18), that is to say, the compressor circuit, operates with maximum efficiency levels that are definitely much higher than a circuit having the same features that is connected directly to the transmission (12) used for driving vehicle movement, that is to say, with revolutions per minute (rpm) variable depending on the speed required of the vehicle (50) in the various propulsion conditions.

It should be noticed that with this configuration, when the vehicle is stationary, the speed of the primary drive unit (11), used for driving vehicle movement, can be brought down to 0 (rpm), thereby interrupting all power consumption by the primary drive unit (11), since all of the power required by the auxiliary services can be supplied by the secondary power unit (13) for service units. Every time that operation of the refrigerating unit is not necessary (for example, after it has reached the temperature set), the apparatus (10) will interrupt the supply of power to the secondary power unit (13) for service units, which will be able to stop, thereby interrupting power consumption.

Therefore, in this configuration, the apparatus (10) is able to maximise the efficiency of the auxiliary services, but not that of the system used for driving vehicle movement.

Figure 3:
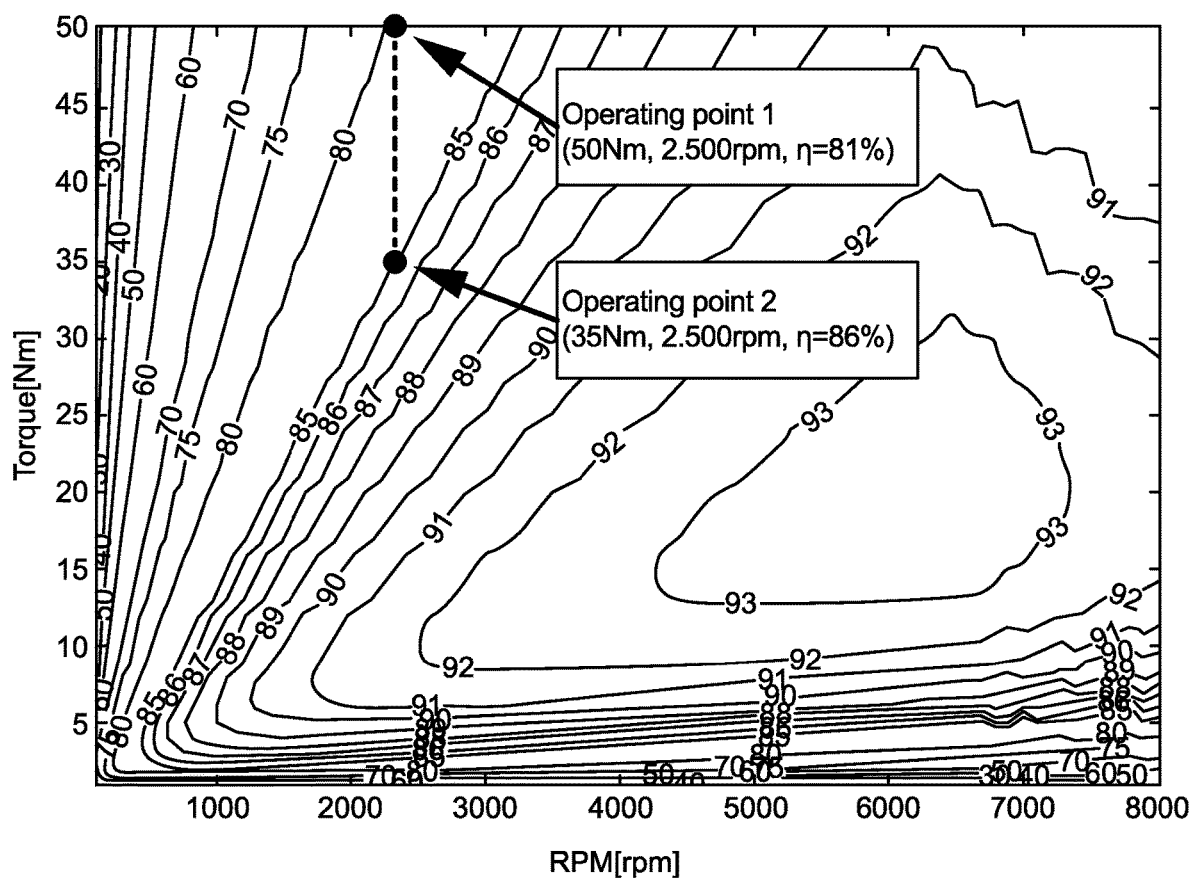
FIG. 3 is an efficiency map of a brushless electric motor with surface magnets advantageously usable in the invention.

Now imagine that the vehicle (50)—in a different example situation—is travelling at a constant speed, with a torque requirement for the drive unit that drives vehicle movement equal to 50 Nm at 2,500 rpm. Considering the drive unit efficiency map (FIG. 3, operating point 1), the drive unit for driving vehicle movement operates with 81% efficiency. In this condition, this invention allows connection of the secondary power unit (13) for service units to the system for driving vehicle movement. This shifts the operating point of the total drive units driving vehicle movement to a higher efficiency value, in this example equal to 86%, therefore recovering 5% efficiency from the system for driving vehicle movement. If the service unit (18) constituted of the auxiliary devices does not require power, it is possible to disconnect the joint (16), so that there is no type of power draw on the services side. Otherwise, the loss of efficiency in the case considered, due to the variation of the operating point of the system of auxiliary services, will be 3%.

The microprocessor-type electronic control device (17) may, therefore, manage distribution of the power of the secondary power unit's drive unit (21), dynamically evaluating the vehicle (50) requirements of power for driving vehicle movement and for services, the efficiency maps of the electric motors (11, 21) and the efficiency curves or maps of the auxiliary devices, in order to always obtain from the apparatus (10) conditions allowing the vehicle (50) to operate in any condition at the maximum efficiency point achievable.

Another advantage of the invention is that it allows use of the sum of the powers of its drive units (11, 21), either for driving vehicle movement, or for the services. In that case, for the vehicle (50) described in the previous example and illustrated in FIG. 1, obviously the vehicle (50) with a 30 kW drive unit (11) for driving vehicle movement is able to supply power up to a maximum of 40 kW either for the auxiliary services, or for driving vehicle movement.

The invention achieves the preset aims and provides further advantages in terms of safety, since at least two drive units (11; 21) are available for driving vehicle movement or for the services, and if one develops a fault, the other can help the vehicle (50) in order to put the vehicle (50) in safer conditions.

The invention described above, which achieves the preset aims, is susceptible of evident industrial application. It may also be modified and adapted in several ways without thereby departing from the scope of the following claims. With regard to that, it should be noticed that electric generators may be used as alternative embodiments of the service unit (18) and/or of the secondary power unit (13) for service units. Moreover, all details of the invention may be substituted by technically equivalent elements.

The invention claimed is:

1. A vehicle, comprising:
   a mechanical transmission, that connects a propulsion unit of the vehicle to a primary drive unit;
   an electric generator configured to supply power to a service unit of the vehicle, wherein the electric generator is operatively positioned between the mechanical transmission and the service unit;

a first joint mounted between the mechanical transmission and the electric generator;

a second joint mounted between the electric generator and the service unit; and a controller, operatively interfaced with the first joint and the second joint, configured to manage selectively sharing of power between the propulsion unit and the service unit, using the first joint and the second joint.

2. The vehicle according to claim 1, wherein the electric generator comprises at least one secondary drive unit configured to generate power to be sent to the service unit.

3. The vehicle according to claim 2, wherein the controller is configured to manage selectively sharing of power towards the service unit based on a correlation between requests for propelling power from the propulsion unit and efficiency curves characteristic of the primary drive unit and/or the secondary drive unit.

4. The vehicle according to claim 2, wherein the secondary drive unit comprises an electric motor.

5. The vehicle according to claim 2, wherein the secondary drive unit comprises a combustion engine.

6. The vehicle according to claim 1, wherein at least one of the first joint and the second joint comprises a clutch.

7. The vehicle according to claim 1, wherein the primary drive unit comprises a second electric generator.

8. The vehicle according to claim 1, further comprising a vehicle battery between the electric generator and the service unit.

9. The vehicle according to claim 1, wherein the controller is configured to manage selectively sharing of power towards the propulsion unit depending on priority requests for propelling power arriving from the propulsion unit.

10. The vehicle according to claim 1, wherein the controller is configured to manage selectively sharing of power towards the propulsion unit based on priority requests for propelling power arriving from the propulsion unit.

11. A method of manufacturing a vehicle, comprising:

connecting, via a mechanical transmission, a propulsion unit to a primary drive unit;

positioning an electric generator between the mechanical transmission and a service unit;

configuring the electric generator to supply power to the service unit;

mounting a first joint between the mechanical transmission and the electric generator;

mounting a second joint between the electric generator and the service unit; and interfacing a controller with the first joint and the second joint, the controller being configured to manage selective sharing of power between the propulsion unit and said service unit using the first joint and the second joint.

12. The method according to claim 11, wherein configuring the electric generator to supply power to the service unit includes configuring at least one secondary drive unit of the electric generator to generate power to be sent to the service unit.

13. The method according to claim 12, wherein interfacing said controller with the first joint and the second joint includes configuring the controller to manage selectively sharing of power towards the service unit based on a correlation between requests for propelling power from the propulsion unit and efficiency curves characteristic of the primary drive unit and/or the secondary drive unit.

14. The method according to claim 12, wherein positioning the secondary drive unit includes positioning an electric motor between the mechanical transmission and the service unit.

15. The method according to claim 12, wherein positioning the secondary drive unit includes positioning a combustion engine between the mechanical transmission and the service unit.

16. The method according to claim 11, wherein at least one of mounting the first joint and mounting said second joint includes mounting a clutch.

17. The method according to claim 11, wherein connecting the propulsion unit to the primary drive unit includes connecting the service unit to a vehicle battery.

18. The method according to claim 11, wherein positioning the electric generator includes positioning a vehicle battery between the electric generator and the service unit.

\* \* \* \* \*